United States Patent [19]

Scharfenberg et al.

[11] Patent Number: 4,495,011
[45] Date of Patent: Jan. 22, 1985

[54] METHOD OF MANUFACTURING DUAL ARCH CORRUGATED PAPERBOARD PRODUCT

[75] Inventors: Paul M. Scharfenberg, Hurst; Kenneth N. Findley, Jr., Arlington, both of Tex.

[73] Assignee: Findley Adhesives, Inc., Brookfield, Wis.

[21] Appl. No.: 365,795

[22] Filed: Apr. 5, 1982

[51] Int. Cl.³ .......................... B32B 31/26; B32B 3/28
[52] U.S. Cl. ..................................... 156/78; 156/210; 156/292; 156/334; 428/186; 428/317.5
[58] Field of Search ................ 156/78, 210, 292, 334; 424/335, 337; 428/182, 186, 317.5

[56] References Cited

U.S. PATENT DOCUMENTS

| 4,150,186 | 4/1979 | Kazama | 428/186 X |
| 4,243,568 | 1/1981 | Brown | 524/915 X |
| 4,311,746 | 1/1982 | Chavannes | 428/186 X |

OTHER PUBLICATIONS

Hughes, Frank T. "Foamed Hot Melt Adhesives", *Adhesives Age*, Sep. 1982, pp. 25–29.

*Primary Examiner*—Robert Dawson
*Attorney, Agent, or Firm*—Andrus, Sceales, Starke & Sawall

[57] ABSTRACT

A method for manufacturing a corrugated paperboard product having a two layer or dual arch corrugated medium applies a vinyl acetate ethylene copolymer adhesive in the foamed state to one entire side of one of the webs of the medium. The webs are passed through heated corrugating rolls to join them together. A liner is applied to one or both sides of the dual arch medium.

13 Claims, 4 Drawing Figures

METHOD OF MANUFACTURING DUAL ARCH CORRUGATED PAPERBOARD PRODUCT

The present invention relates to an improved method for manufacturing corrugated paperboard products of the dual arch type.

Corrugated paperboard products consist of a fluted central medium having a liner glued to the tips of the flutes on one side (single faced product) or on both sides (double faced product). In "dual arch" products the medium comprises two layers of paper glued together. A dual arch corrugated product possesses improved stacking strength, crush resistance, and Mullen; reduced moisture penetration; and other desired properties.

Dual arch corrugated paperboard is made by applying glue to one of the sheets of the medium and bringing the webs into contact to join them together prior to corrugation. At present, the glue is typically poly vinyl acetate. After application of the glue, the two web medium is passed through heating fluting rolls to assist in drying the glue and to corrugate the medium. Additional glue, typically starch or starch based, is applied to the tips of the flutes of the corrugated medium and the liner applied to the medium to produce single faced board. If double faced board is being manufactured, glue is applied to the flutes on the other side of the medium and the second liner is laid on the medium. The product is then pressed between belts and passed down an elongated dryer section that sets and dries the adhesive.

At present, the two webs of the medium are glued together by applying the glue in liquid form in spaced beads running parallel to the direction of movement of the web. This results in alternate wet and dry areas on the web that may be detrimental to the product. Or the entire web may be roll coated with the glue. In either process, the speed at which the corrugating process may be carried out is limited by the need to develop tack in the glue on the webs. This is necessary in order to obtain a sufficient bond between the webs and to avoid slipping and wrinkling of the webs.

It is, therefore, the object of the present invention to provide an improved method for producing dual arch corrugated paperboard product that overcomes the foregoing shortcomings and provides a high quality product at high speed.

Briefly, the present invention employs a thermoplastic bonding agent that is applied in the foamed state over one entire surface of at least one of the webs. After such application, the adhesive rapidly attains a dry state due to the low moisture content of the foam. The webs are then brought together and subjected to heat and pressure, as in the corrugating rolls of the corrugating machine to form the dual arch medium. The heat and pressure in the corrugating rolls reactivates the bonding agent to effect the bonding of the webs of the medium. Adhesive is applied to the flutes of the bonded dual arch corrugated medium and a liner applied to one or both sides of the medium.

The bonding agent may utilize vinyl acetate homopolymers and/or copolymers. A highly satisfactory adhesive for use in the process of the present invention has been compounded by adding to vinyl acetate ethylene copolymer, an insolubilizing agent that lends water resistance to the adhesive, and a preservative. The adhesive so compounded is foamed to contain between 60% and 90% air by weight.

The invention will be more fully understood by reference to the following drawings in which.

Figure 1:
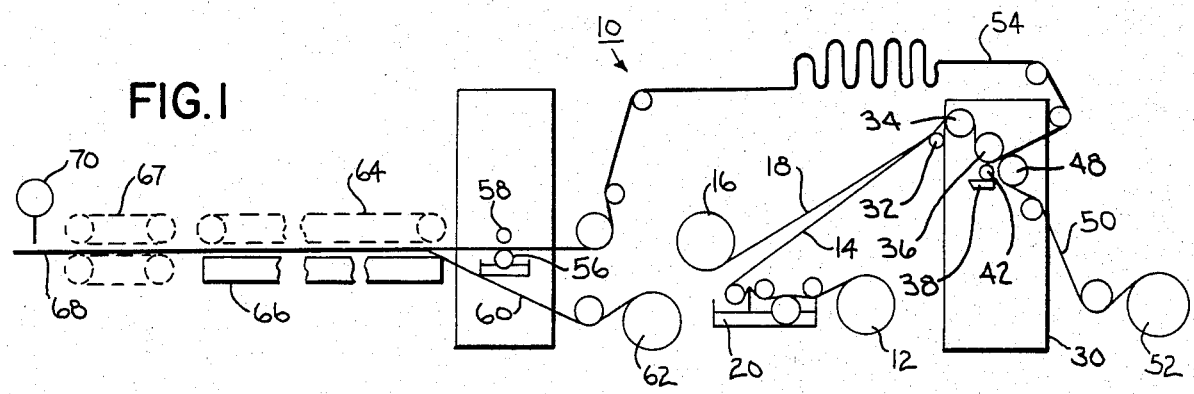
FIG. 1 is a somewhat schematic illustration of apparatus suitable for carrying out the method of the present invention.
Figure 3A:
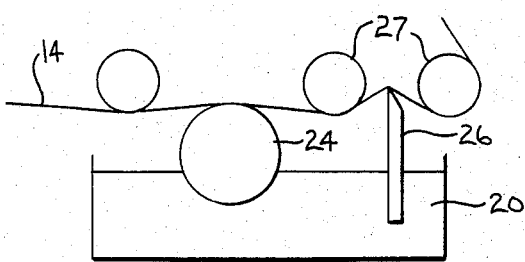
FIGS. 3A and 3B are a somewhat schematic illustration of alternate embodiments of a portion of the apparatus of FIG. 1.
Figure 3B:
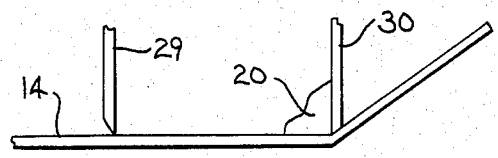

FIG. 1 shows apparatus suitable for carrying out the method of the present invention in the form of a corrugating machine 10. Roll 12 contains one web 14 of the dual arch medium. Roll 16 contains the second web 18. In accordance with the present invention, foamed thermoplastic bonding agent 20, is applied to web 14. FIGS. 3A and 3B show alternate embodiments of means for applying the bonding agent. Roll 24 applies adhesive to web 14. As shown in FIG. 3A, doctor blade 26 between two idler rolls 27 meters the bonding agent to an amount sufficient to reactivate and bond the webs while permitting the bonding agent to dry before combining the webs. As shown in FIG. 3B, the bonding agent may reside between two doctor blades 29 and 31, one of which meters the bonding agent onto web 14. This permits application of the bonding agent to the upper side of the web, if desired.

Figure 2:
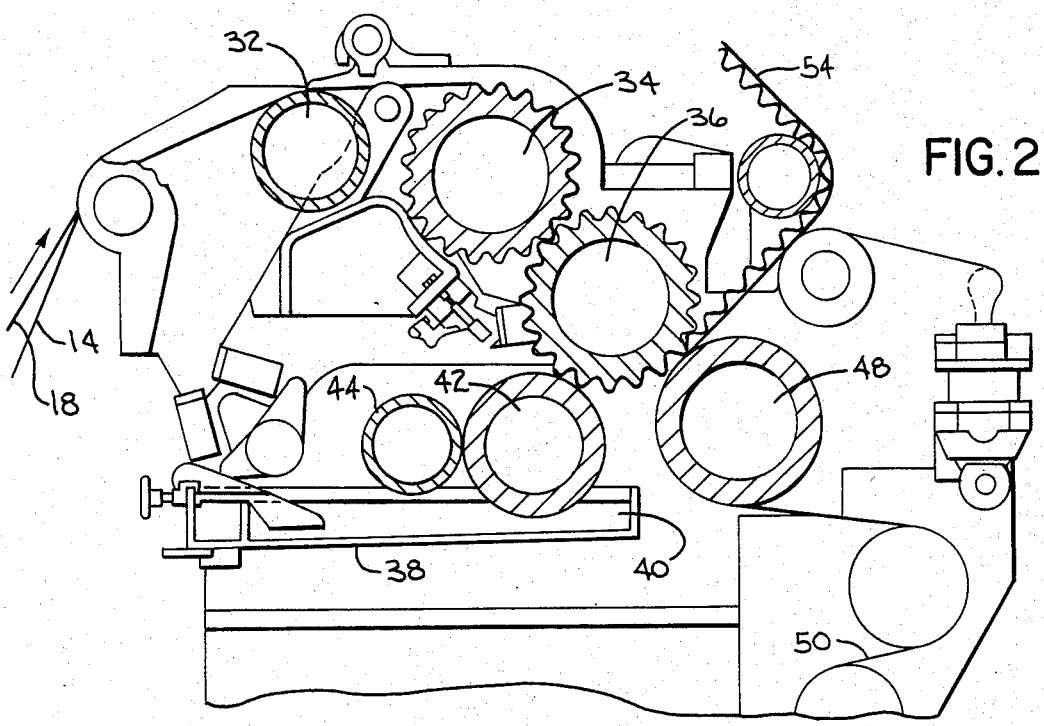
FIG. 2 is a detailed view of portions of the corrugating machine of FIG. 1.

Webs 14 and 18 are fed to the single facer portion 30 of corrugating machine 10, shown in FIGS. 1 and 2 with the surface of web 14 containing the bonding agent facing web 18. The webs proceed over input roll 32 and between heated corrugating rolls 34 and 36. The passage of the webs between the corrugating rolls reactivates the bonding agent 20 on web 14 to bond the webs together to form the dual arch corrugated medium.

Pan 38 contains adhesive 40 to be applied to the tips of the dual arch medium. This adhesive may be the same as bonding agent 20 or of a different type. Roll 42 rotating in pan 38 and coacting with metering roll 44 applies adhesive 40 to the tips of the flutes on one side of the dual arch medium.

The dual arch medium then proceeds around corrugating roll 48 to receive liner 50 supplied from roll 52. The liner adheres to the tips of the flutes containing adhesive 40. Liner 50 and the dual arch medium exit single facer 30 as single faced dual arch corrugated paperboard product 54.

Product 54 may be used as such, or a liner may be applied to the other side of the medium to form a double faced corrugated paperboard product. If a double faced corrugated paperboard product is desired, single faced product 54 passes over roll 56 that applies adhesive to the flutes on the other side of the medium. Pressure roll 58 insures proper application of the adhesive to the tips of the flutes. A second liner 60 from roll 62 is applied to the medium. Pressure belts 64 hold the medium and liner 60 together until the adhesive is set. The product may be heated by plates 66 to assist the gluing and cooled at station 67. Double faced dual arch product 68 is then cut by knife 70 into the desired size.

It is desirable that thermoplastic bonding agent 20 have a softening point in a range of 150°-250° F., preferably about 180° F. Thermoplastic bonding agent 20 may include a colloidal suspension of at least one of vinyl acetate homoploymers and copolymers. A highly suitable bonding agent has been formulated as a vinyl acetate ethylene copolymer adhesive, using the copolymer manufactured and sold by Air Products Corporation under the designation Airflex 300. Such a product consists of the copolymer in a protective colloidal suspension system. Oxalaldehyde, also called biformyl or diformyl, may be employed as the insolubilizing or cross linking agent to lend water resistance to the adhesive. A suitable agent is that made and sold by American Hoechst under the designation Glyoxal 40%. A preservative of an aqueous solution of 1, 2 benzisothiazolin-3-one such as that made and sold by ICI United States, Inc. under the designation Proxcel may be added to the adhesive.

A formulation of the following general proportions by weight has been found suitable for use in the process of the present invention.

| Vinyl acetate ethylene copolymer | 93 parts |
| water | 6+ parts |
| Glyoxal 40% | .2 parts |
| Proxcel | .1 parts |

The adhesive so formulated is foamed prior to application to web 14 of the corrugated medium to contain between 60% and 90% air by weight, preferably 60% air by weight. Commercially available foaming equipment may be employed for this purpose, as for example, that manufactured by Findley Adhesives, Inc., of Elm Grove, Wisconsin or Ease, Inc. of Dalton, Georgia. In such equipment, air and adhesive are admitted to a chamber having a toothed rotor and toothed inner wall. The interaction of the rotor and inner walls as the rotor spins in the chamber whips the adhesive to a foam.

We claim:

1. A process for forming a corrugated paperboard product having a dual arch corrugated medium fastened to at least one liner, comprising the steps of:
   providing first and second webs of medium material;
   applying a dryable water-based emulsion adhesive bonding agent in a foamed state over substantially the entire surface of at least one of said webs;
   drying the bonding agent instantaneously after its application on said one web by evaporating the water from said bonding agent so that the bonding agent assumes a dry condition;
   bringing the webs together after the bonding agent is dry to form a dual arch medium;
   corrugating the medium so formed while simultaneously applying heat to said medium to activate the dried bonding agent to seal the webs together;
   applying adhesive to the flutes of the corrugated medium; and
   adhering the liner to the medium.

2. The process of claim 1 further defined as a method for forming a double faced corrugated paperboard product having a liner on both sides of the dual arch corrugated medium and wherein adhesive is applied to the flutes on both sides of the corrugated medium and a liner is adhered on both sides of the medium.

3. The process of claim 1 further defined as heating said medium to between 150°–250° F.

4. The process of claim 3, further defined as heating said medium to 180° F.

5. The process of claim 1 further defined as including the step of foaming the bonding agent to between 60%–90% by weight air.

6. The process of claim 5 further defined as including the step of foaming the bonding agent to 80% by weight air.

7. The process of claim 6 further defined as applying a thermoplastic bonding agent including at least one of vinyl acetate homopolymers and copolymers.

8. The process of claim 7 further defined as applying a bonding agent formed as an adhesive of vinyl acetate ethylene copolymer.

9. The process of claim 8 further defined as providing a vinyl acetate ethylene copolymer adhesive including an insolubilizing agent to enhance the water resistance of the bonds formed by the adhesive.

10. The process of claim 9 further defined as providing a vinyl acetate ethylene copolymer adhesive including an insolubilizing agent comprising oxalaldehyde.

11. The process of claim 8 further defined as providing a vinyl acetate ethylene copolymer adhesive including a preservative.

12. The process of claim 11 further defined as providing an adhesive including a preservative comprising an aqueous solution of 1, 2, benzisothiazolin-3-one.

13. The process of claim 1 or 8 wherein the bonding agent applied to the flutes of the medium is the same as that applied to the web.

* * * * *